W. H. BRISTOL.
ELECTRIC MOTOR DEVICE.
APPLICATION FILED MAR. 12, 1914.
1,162,447. Patented Nov. 30, 1915.
3 SHEETS—SHEET 1.
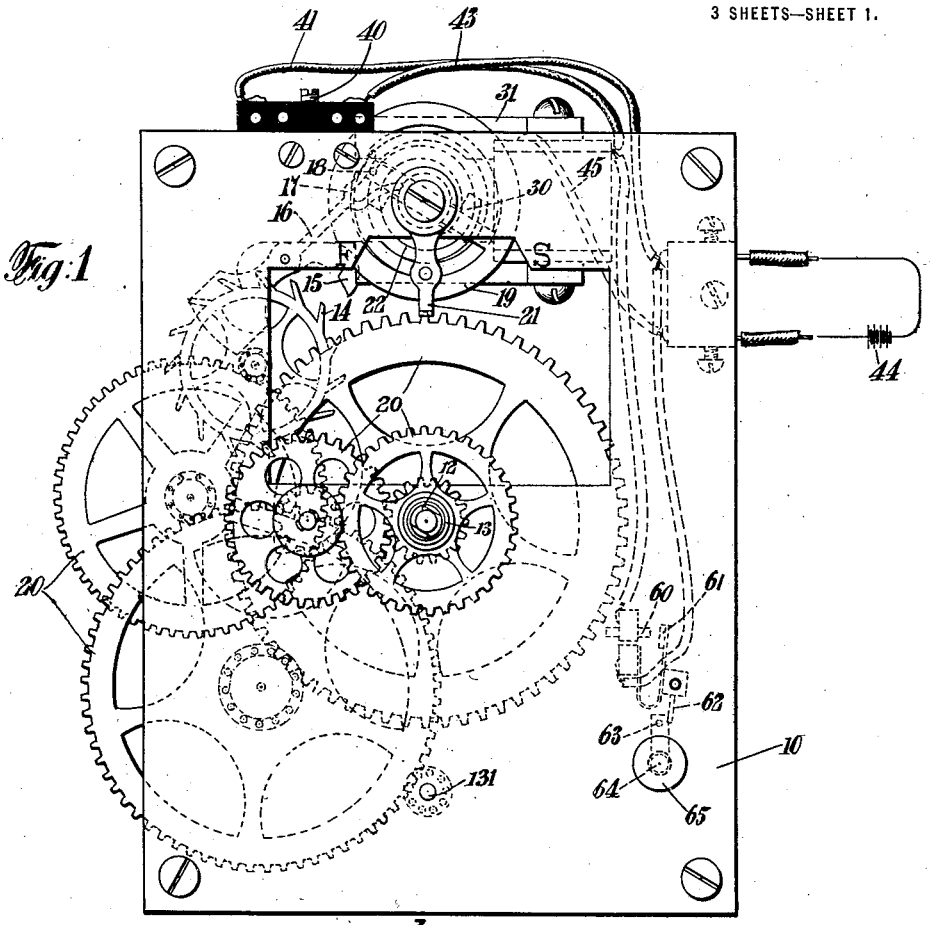
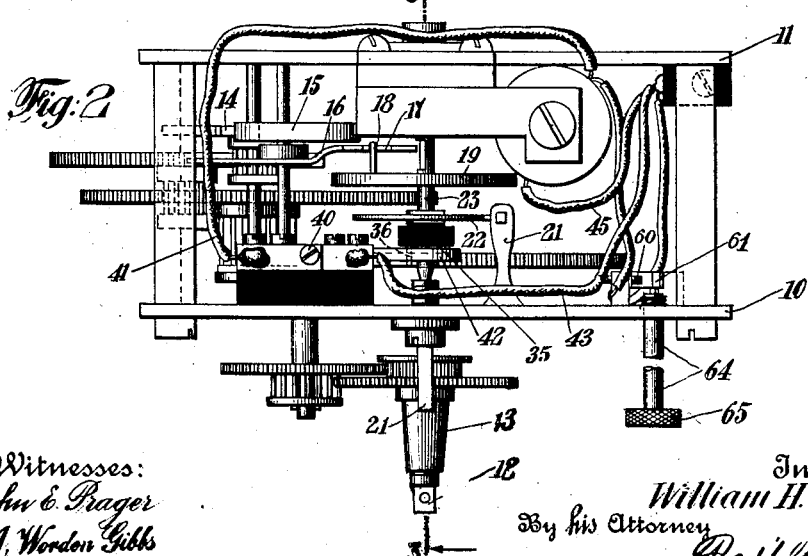
Witnesses:
John E. Prager
A. Worden Gibbs
Inventor
William H. Bristol
By his Attorney
Fredk. F. Schuetz W. H. BRISTOL.
ELECTRIC MOTOR DEVICE.
APPLICATION FILED MAR. 12, 1914.
1,162,447.
Patented Nov. 30, 1915.
3 SHEETS—SHEET 2.
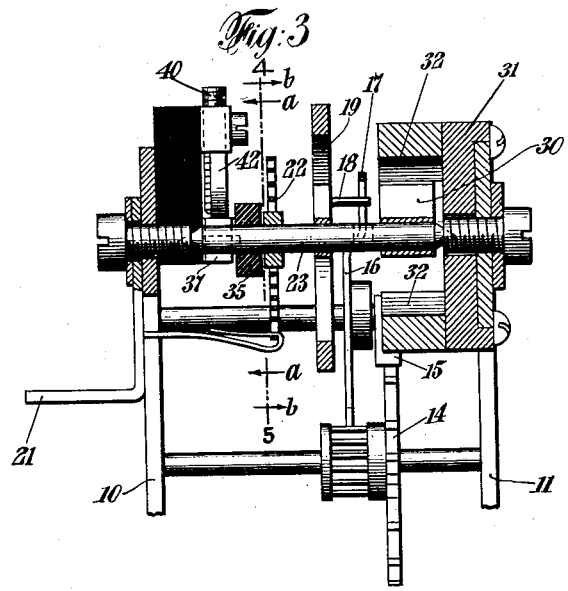
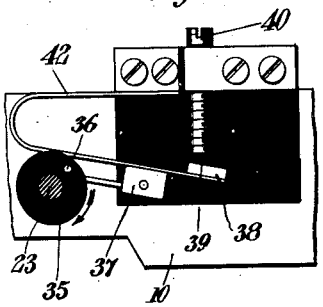
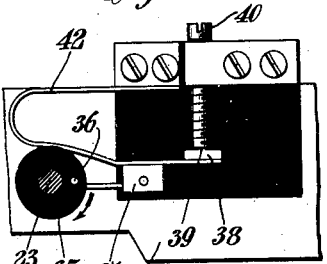
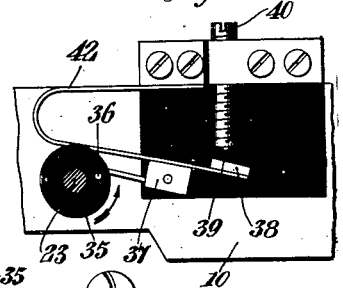
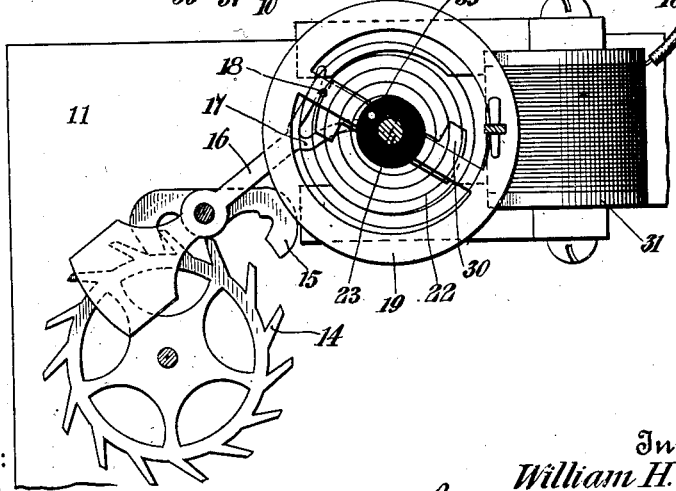
Witnesses:
John E. Prager
A. Worden Gibbs
Inventor
William H. Bristol
By his Attorney
Fredk F. Schuetz

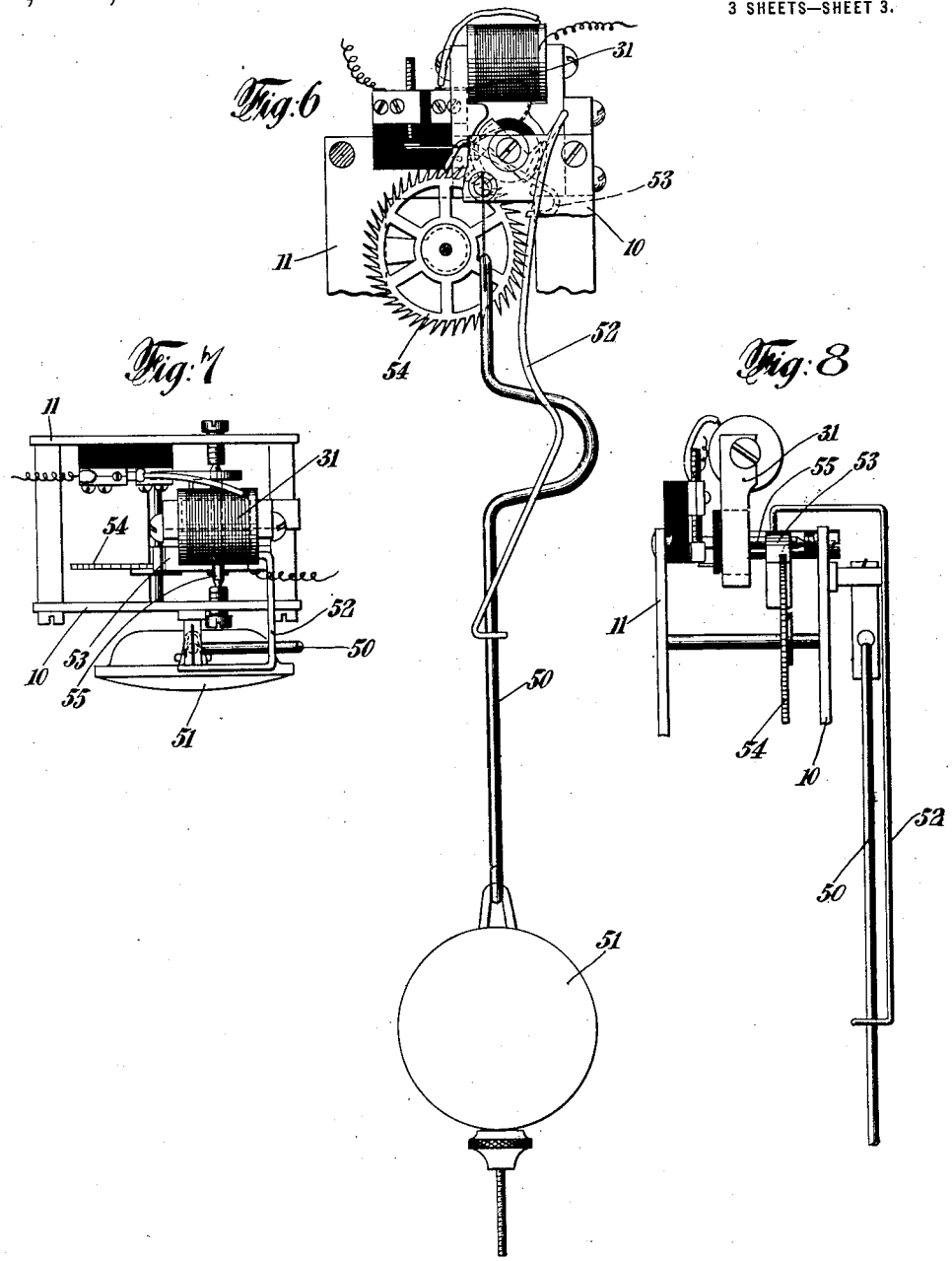

UNITED STATES PATENT OFFICE.

WILLIAM H. BRISTOL, OF WATERBURY, CONNECTICUT, ASSIGNOR TO THE BRISTOL COMPANY, OF WATERBURY, CONNECTICUT, A CORPORATION OF CONNECTICUT.

ELECTRIC-MOTOR DEVICE.

1,162,447.  Specification of Letters Patent.  Patented Nov. 30, 1915.

Application filed March 12, 1914. Serial No. 824,087.

*To all whom it may concern:*

Be it known that I, WILLIAM H. BRISTOL, a citizen of the United States, and a resident of Waterbury, in the county of New Haven and State of Connecticut, have invented certain new and useful Improvements in Electric-Motor Devices, of which the following is a specification.

The invention relates to low power, electrically driven motors, for example, as embodied in electric clocks, or in analogous mechanism adapted to rotate a record chart or the like at a predetermined angular velocity.

In such embodiment, the invention has for its object to retain so far as possible, the highly developed construction of a modern clock movement and to render it possible, with but slight alteration, to drive the same electrically, whereby it will require but little or no attention for a considerable period of time.

A further object of the invention is to so design the motor that it shall be compact, consume but an extremely small amount of power, run at constant speed under a reasonable variation of the driving current and possess the necessary time keeping qualities of a clock.

To this end, the invention consists in imparting to the balance wheel, or an equivalent member, of a clock mechanism of usual construction a periodic impulse and in causing the oscillation thereof produced by said impulse to be transmitted directly as an intermittent rotation to a ratchet wheel in the position of the usual escape wheel of the clock train. The said impulses are imparted through electro-magnetic means, the operating circuit therefor being completed but once during each cycle of the balance wheel, pendulum, or the like and at the most effective position thereof. Moreover, the direct energy of impulse is preferably divided in its action upon the ratchet wheel, being in part employed upon one stroke of the balance wheel or pendulum to effect an advance of the ratchet wheel and the residual energy accumulated by the said balance wheel or pendulum then being employed upon the return stroke to effect a further advance of said ratchet wheel.

The nature of the invention will be best understood when described in connection with the accompanying drawings, in which—

Figure 1 is an elevation of a balance wheel clock movement, the casing and hands of the clock being removed. Fig. 2 is a plan thereof. Fig. 3 is a vertical section taken on the line 3—3, Fig. 2, and looking in the direction of the arrows. Fig. 4 is a sectional view taken on the line 4—5, Fig. 3, and looking in the direction of the arrows (*a*); and Figs. 4ª and 4ᵇ are similar views showing different operating positions of the contact mechanism. Fig. 5 is a sectional view taken on the line 4—5, Fig. 3, and looking in the direction of the arrows (*b*). Fig. 6 is a fragmentary front elevation of a pendulum clock movement, the casing and hands being removed; and Figs. 7 and 8 are respectively a plan and side elevation thereof.

Similar characters of reference designate corresponding parts throughout the several views.

Referring to the drawings, 10 and 11 designate frame plates between which is held the clock movement, as is well understood, 12 13 and 131 designating respectively the arbors for the hour, minute and second hands. The movement is of the marine type, but in accordance with the present invention is driven in reverse manner, namely, from the escapement end, a ratchet wheel 14 being employed in place of the usual escape wheel and with the teeth reversed. The detent or pallet 15 is rocked by a counterbalanced lever 16 such that upon oscillation in each direction, the ratchet wheel is proportionally advanced, thus distributing the work and reducing the disturbing effect upon the time keeping properties to a minimum. Lever 16 is provided with a fork 17 at its farther end which is adapted to coact with a pin 18 of the balance wheel 19 as the latter oscillates. The fork of the lever 16 is made somewhat longer than in the usual movement and the pin 18 in engagement therewith is located on the balance wheel 19 at a longer radius, whereby greater throw of the pallet or detent 15 is obtainable for advancing the ratchet wheel 14. The movement of the latter is transmitted through the usual train of gears 20 to the various arbors 12, 13, and 131, the driving spring or the like and intermediate connecting gears present in the usual clock movement being of course omitted.

The angular velocity of the ratchet wheel 14 is suitably timed and controlled in the usual manner by an adjusting arm 21 of the balance wheel, or rather hair spring 22 thereof.

To periodically oscillate the said balance wheel 19 and effect thereby the advance of the ratchet wheel 14, there is mounted upon the balance wheel shaft 23 an armature 30 of an electric motor 31. This armature is shown as Z-shape; and normally under the action of hair spring 22 assumes an inclined position between the respective poles 32 of the motor. When the circuit to the motor is momentarily closed, as will be hereinafter set forth, armature 30 will be swung toward a position substantially parallel to the lines of magnetism; and, upon the breaking of the circuit will be returned under the action of hair spring 22. Thus, as the circuit is alternately completed and broken, the armature 30 and with it shaft 23 and balance wheel 19 mounted thereon are accordingly oscillated.

To effect the make and break of the circuit for energizing motor 31, shaft 23 is provided with a disk of insulation 35 which partakes of the motion of said shaft and carries a pin 36 directed parallel to the shaft. Pin 36 is adapted, as the shaft and disk oscillate, to engage with and rub past one end of a lever 37 pivotally connected to the plate 10. The other end of this lever is provided with a contact 38 normally removed from a similar contact 39 at the end of an adjustable screw 40 secured to the said plate 10. These contact points may be made of suitable metal such as silver or platinum to insure good contact. The screw 40 is connected with one terminal of the motor 31 through a lead 41; and the contact 38 through a spring 42 and lead 43 with a battery 44 of one or more dry cells, the other terminal of the motor being connected directly to the said battery 44 by lead 45. As contact is made between the points 38 and 39, motor 31 will, therefore, be momentarily energized. Spring 42 normally holds the lever 37 in a position such that no contact is made between the points 38 and 39; and, the contact arm thereof is also preferably made slightly flexible. As pin 36 engages lever 37 contact between points 38 and 39 will be momentarily effected, as shown in Fig. 4, the position at the beginning of the stroke being indicated in Fig. 4ª. Upon the return stroke, pin 36 will move the lever 37 in a direction to further separate the said contacts, as shown in Fig. 4ᵇ. With the aforesaid contact and motor device, the oscillation period of the balance wheel will be substantially independent of a reasonable variation in the voltage of the battery, a weaker impulse tending to cause the speed of the motor to slow down which would effect a longer contact period, and a stronger impulse tending to effect a greater swing of the same and consequently a shorter period of contact, thus maintaining uniform rate of oscillation. The contacts are arranged, furthermore, such that the impulse is imparted substantially at the middle of the oscillation and which is the most suitable position.

The electric drive as set forth herein in connection with clock movements employing a balance wheel is equally applicable with but slight modification to clock movements employing a pendulum. In the latter case, reference being had more particularly to Figs. 6 to 8, it may be found necessary to change the location of the pendulum support somewhat, the same being shown above the escape wheel position, the pendulum rod 50 with attached bob 51, however operating in precisely the same manner through wire 52 to oscillate a pallet 53. This pallet, similarly to the pallet 15 of the balance wheel movement, operates to advance a ratchet wheel 54 and through the same the clock train. In the pendulum embodiment, due to the shorter amplitude of oscillation, however, the said pallet 53 may be and is shown directly connected to a shaft 55 corresponding to the balance wheel shaft 23 of the motor 31, the latter being located between the plates 10 and 11 of the clock frame and at the top of the movement. The contact mechanism is, for convenience, located upon the opposite side of the motor, being secured to the plate 11; and is precisely similar to that disclosed in connection with the balance wheel movement.

To conveniently start the clock, means to momentarily short circuit the contacts 38 and 39 are provided and whereby a momentary energization of the motor is caused to initiate the oscillation of the balance wheel or pendulum as the case may be. Referring to Figs. 1 and 2 of the drawings, means for this purpose are disclosed and consist of a contact device similar to the device for making and breaking the electro motor circuit, 60 and 61 designating the two contact points and the latter being pivotally mounted at one end of a lever having an arm 62 extending therefrom. This arm is adapted to be engaged by a pin 63 connected to a spring tensioned shaft 64 extending through the plate 10 and provided with a knurled head 65 whereby the shaft may be partly rotated in opposition to the spring. Contact is thus momentarily effected between the points 60 and 61 as pin 63 wipes past arm 62 in one direction; and upon releasing the knurled head, the shaft is returned to its normal position by the spring and without effecting a further contact.

I claim:—

1. A clock train, comprising: a ratchet wheel; an electric motor having a shaft adapted to be oscillated thereby, and a suitable motor circuit; a balance wheel on said shaft; contact operating means carried by said shaft and operative to close the motor circuit to energize the said motor but once during each complete oscillation of the said shaft; a pin carried by said balance wheel, and a forked lever adapted to coact therewith; and a pallet rocked by said lever and acting to advance said ratchet wheel twice during each complete oscillation of the said shaft.

2. In apparatus of the character set forth: an oscillating shaft and circuit controlling mechanism actuated thereby and including a tensioned, pivoted lever, one arm thereof carrying one of the contact points; a fixed member carrying a contact point adapted to coöperate therewith; and a pin actuated by the said shaft and adapted to engage the other arm of said lever and wipe past the same to effect a contact of the said contact points in one direction of oscillation only of said shaft.

Signed at New York, in the county of New York, and State of New York, this 10th day of March, A. D. 1914.

WILLIAM H. BRISTOL.

Witnesses:
 FRED'K F. SCHUETZ,
 LAURA E. SMITH.